United States Patent [19]

Scott

[11] Patent Number: 5,656,176

[45] Date of Patent: Aug. 12, 1997

[54] METHOD OF FILTERING A SUBTERRANEAN FLUID FROM A WELL BORE USING A RESIN BONDED WELL LINER

[76] Inventor: Gregory D. Scott, 3107 Singingwood Dr., Torrance, Calif. 90505

[21] Appl. No.: 602,102

[22] Filed: Feb. 15, 1996

Related U.S. Application Data

[62] Division of Ser. No. 311,577, Sep. 23, 1994, Pat. No. 5,500,174.

[51] Int. Cl.⁶ ........................................ B01D 37/00
[52] U.S. Cl. ................ 210/747; 210/767; 264/112; 264/122; 264/126; 264/DIG. 48; 166/278
[58] Field of Search ........................... 210/747, 767; 264/112, 122, 126, DIG. 48; 166/278

[56] References Cited

U.S. PATENT DOCUMENTS

| | | | |
|---|---|---|---|
| 2,843,209 | 7/1958 | Degen | 166/228 |
| 2,981,333 | 4/1961 | Miller et al. | 166/12 |
| 3,107,727 | 10/1963 | Howard | 166/12 |
| 3,133,595 | 5/1964 | Loughney et al. | 166/228 |
| 3,225,821 | 12/1965 | Curlet | 166/46 |
| 3,361,203 | 1/1968 | Rensvold | 166/12 |
| 3,683,056 | 8/1972 | Brandt et al. | 264/112 |
| 4,487,259 | 12/1984 | McMichael, Jr. | 166/228 |
| 4,518,039 | 5/1985 | Graham et al. | 166/276 |
| 4,585,064 | 4/1986 | Graham et al. | 166/276 |
| 4,597,991 | 7/1986 | Graham et al. | 427/214 |
| 4,732,920 | 3/1988 | Graham et al. | 523/145 |
| 4,811,790 | 3/1989 | Jennings, Jr. et al. | 166/278 |
| 4,888,240 | 12/1989 | Graham et al. | 428/403 |
| 5,004,049 | 4/1991 | Arterbury | 166/228 |
| 5,058,676 | 10/1991 | Fitzpatrick et al. | 166/278 |
| 5,083,614 | 1/1992 | Branch | 166/278 |
| 5,088,554 | 2/1992 | Arterbury et al. | 166/228 |
| 5,150,753 | 9/1992 | Gaidry et al. | 166/278 |
| 5,190,102 | 3/1993 | Arterbury et al. | 166/228 |
| 5,232,048 | 8/1993 | Whitebay et al. | 166/228 |

FOREIGN PATENT DOCUMENTS

| | | |
|---|---|---|
| 1020910 | 6/1950 | France . |
| 144802 | 4/1962 | U.S.S.R. . |

*Primary Examiner*—Robert Popovics
*Attorney, Agent, or Firm*—Fulwilder Patton Lee & Utecht, LLP

[57] ABSTRACT

An apparatus and method of manufacturing a prepacked resin bonded well liner comprised of bonding granular particles to a perforated pipe. The granular particles are coated with a partially polymerized resin that is hard and tacky to the touch. Upon the introduction of heat, the polymerization proceeds, curing the resin into an insoluble and infusible cross-linked state. The contact regions between the adjacent particles bond the packed particles into a porous and permeable matrix.

1 Claim, 5 Drawing Sheets

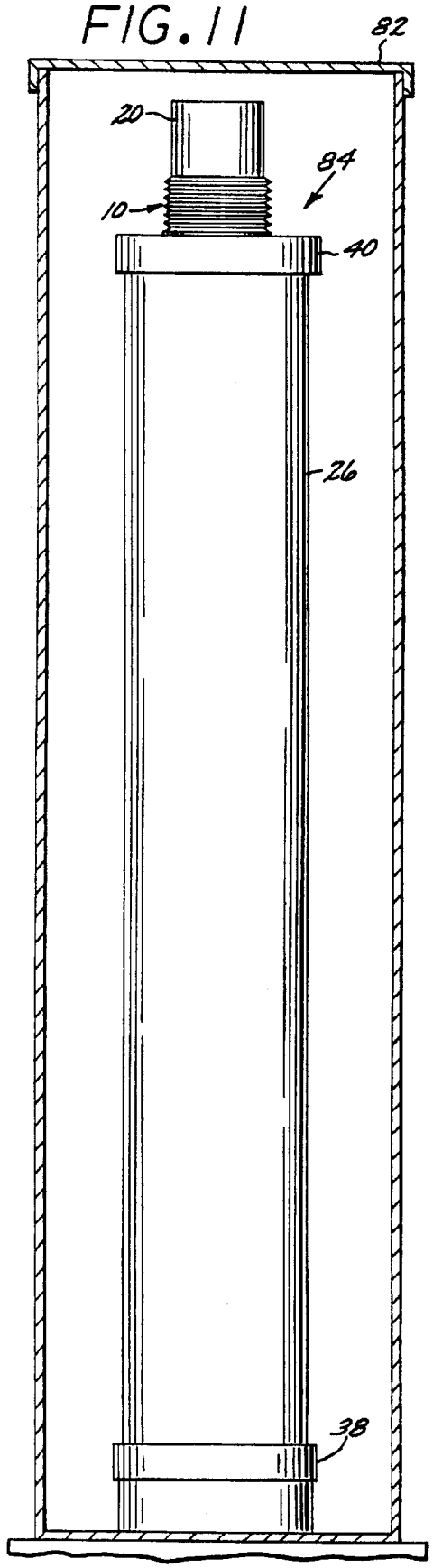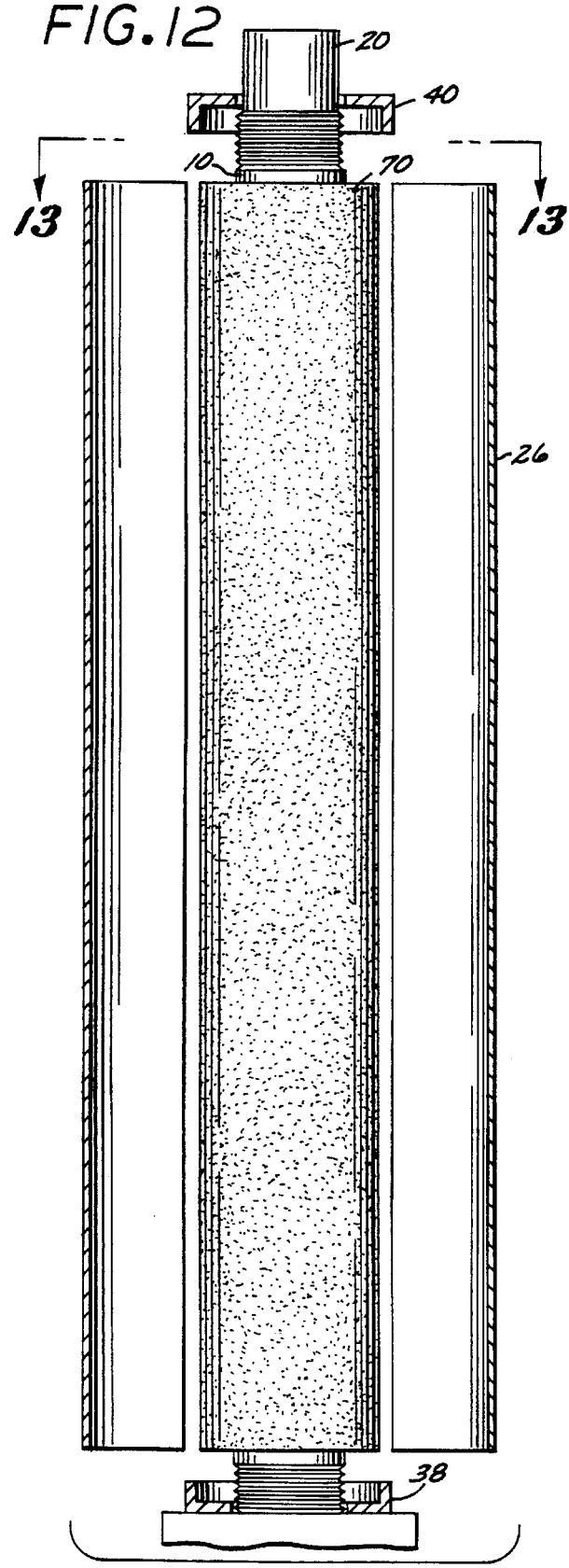

METHOD OF FILTERING A SUBTERRANEAN FLUID FROM A WELL BORE USING A RESIN BONDED WELL LINER

This is a divisional of application Ser. No. 08/311,577 filed on Sep. 23, 1994, now U.S. Pat. No. 5,500,174.

BACKGROUND

The present invention generally relates to apparatus for filtering and screening particulate matter in downhole wells, and, more particularly, to an improved method of manufacturing a prepacked well liner for filtering unconsolidated material out of inflowing well fluid such as water, oil or gas.

In the course of completing an oil and/or gas well, it is common practice to run a string of casing into the well bore and then to run the production tubing inside the casing. At the well site, the casing is perforated across one or more production zones to allow production fluids to enter the casing bore. During production of the formation fluid, formation sand is also swept into the flow path. The formation sand is relatively fine sand that erodes production components in the flow path. In some well completions, the well bore is uncased, and an open face is established across the oil or gas bearing zone. Such open bore hole arrangements are utilized, for example, in water wells, test wells, and horizontal well completions.

It is generally known that the production of fluids from an underground producing formation is often reduced or is completely chocked off by the movement of sand and/or other finely divided solid materials into the well bore. Sand and finely divided solids are also troublesome when they are entrained in the producing fluids because of abrasion of pump parts and other equipment.

It is a general practice to employ strainers or screening devices to overcome the above noted problems. A wide variety of well filter devices have been devised to prevent the movement of sand and other materials into the producing zone of wells. Such devices usually consist of a perforated metal mandrel generally employed in association with a fine mesh screen. The perforated metal mandrel and fine mesh screen are installed in the flow path between the production tubing and the perforated casing (cased) or the open well bore face (uncased). In a procedure called gravel packing, the annulus around the screen is packed with a relatively coarse sand or gravel which acts as a filter to reduce the amount of fine formation sand reaching the screen. The gravel and sand, which is often called a proppant, is pumped down the well in a slurry of water or gel. In well installations in which the screen is suspended in an uncased open bore, the gravel pack further supports the surrounding unconsolidated formation.

A problem, which arises during initial production following the gravel packing operation, is that fine sand may be carried through the gravel pack before the gravel pack stabilizes. It is not unusual to produce a substantial amount of fine sands before the gravel pack finely consolidates and yields clean production. After gravel packing and during the early stages of well production, these fines tend to migrate through the gravel packing and screen and lodge within the inner annulus between the wire wrap and the perforated mandrel. In some instances, this can cause severe erosion of the screen and ultimate failure of the screen to reduce sand invasion. In other situations, the sand fines may include plugging materials which can completely plug the mandrel flow passages and terminate well production shortly after completion. In deep wells, when the screen becomes plugged and the pressure in the production tubing is reduced, the formation pressure can collapse the screen and production tubing. Moreover, when a substantial amount of sand has been lost from the surrounding formation, the formation may collapse with a resultant damage to the well casing or liner and consequent reduction or termination of production.

A further problem with gravel packing is that gravel packed liners can deteriorate over time and can be difficult to replace because removal from the well bore can cause the metal screen to become entangled or broken during removal from the well. Gravel packing can also create a non-uniform filter in high angle and horizontal wells due to the difficulty in the proper placement of the sand or gravel with current packing techniques. Additionally, the gravel packing procedure is both expensive and complicated.

One attempt to overcome the foregoing problems of gravel packing has been to interpose a prepack of bonded proppant between the perforated mandrel and the perforated casing or the open well bore face. The mesh wire screen is replaced by a permeable filter body of granular material, for instance gravel, which is cemented together by a binding agent which is insoluble by water or other liquid to be filtered and which is permanently adhered to the perforated pipe. See, for example, U.S. Pat. No. 2,843,209 issued to W. Degen and U.S. Pat. No. 3,361,203 issued to R. Rensvold which are incorporated herein by reference. The binding agent is typically an artificial resin such as a thermoplastic or thermosetting resin such as phenol formaldehyde, urea formaldehyde or melamine formaldehyde. The grain size of the gravel or sand is adapted to the soil conditions surrounding the filter which may be uniform or it may comprise several layers containing different binders and proppants.

Unfortunately, the process lacks control in the ability to provide uniform interstitial spaces between proppant grains. During the curing process the resin remains free flowing thereby allowing the resin coating to flow into the interstitial regions between proppant grains. The resin in the proppant interstices results in random plugging of the pore spaces during the curing process. This has resulted in such diminished porosity and permeability of the well filter that such well liner has not continued in general use in the well drilling industry.

An attempt to overcome the problems of resin plugging of a prepacked liner is disclosed in U.S. Pat. No. 3,683,056 issued to Brandt et al. The resin bonded particles are cured in a mixture of hot wax to cause the bonding agent to polymerize and consolidate the particle pack while allowing the wax to cool in and around the particle pack and in the interstitial regions between contiguous particles. Once the prepacked liner is installed in the well, the formation heat causes the wax to melt and be removed from the prepack thereby providing for a porous and permeable matrix of resin bonded particles. Unfortunately, the subject method is not suitable where formation temperatures are insufficient to melt the wax disposed in the interstitial regions of the matrix. Furthermore, the wax procedure is both expensive and complicated involving complicated machinery to pump and mix the molten wax bath.

SUMMARY

The present invention addresses the aforementioned disadvantages by providing an improved method of manufacturing a prepacked well liner that achieves increased porosity and permeability and accordingly, an increase in fluid flow from a downhole well. The manufactured prepacked well liner consists of a perforated pipe which is coated by a permeable granular material, often referred to as a proppant, which functions as a filter. The granular material is cemented together by a binding agent which is insoluble by water or other liquid to be pumped and filtered to form a porous annulus which is permanently adhered to the perforated pipe. The grain size of the granular material may be adapted to the soil conditions surrounding the filter.

In a preferred embodiment of the present invention, a base pipe is machined to include a plurality of apertures. The apertures are longitudinally and radially spaced to provide for fluid communication therethrough. The base pipe is further formed with each extremity threaded. In this manner, the base pipe is capable of being coupled to additional base pipes to provide for an extensible production pipe. An inner mold is then positioned in the interior bore of the base pipe. The inner mold is configured as a cylinder having a diameter substantially equal to the bore of the base pipe and a length substantially equal to the length of the base pipe. The inner mold thereby effectively restricts any particulate materials, particularly the proppant, from flowing into the inner bore of the base pipe from the exterior of the base pipe during the manufacturing process.

Likewise, an outer mold is also employed to shape the proppant during the manufacturing method of the present invention. The outer mold includes a cylindrical inner bore of a diameter greater than the diameter of the base pipe. The bore terminates at each of its extremities in an end plate which is formed with a circular orifice disposed concentric with the outer mold bore and having a diameter equal to the outer diameter of the base pipe. The outer mold is further slit the length of the outer mold along the axis of the bore to form two outer mold halves which are joined lengthwise by a hinge in clamshell manner. During the manufacturing process of the present invention, the base pipe is positioned in the outer mold with its extremities telescoping through the endplate orifices to form an annulus between the base pipe and the outer mold.

Once the inner mold has been inserted into the base pipe and the outer mold has been positioned around the base pipe, the annulus is filled with resin coated particles. The resin coating the particles is a partially polymerized thermosetting resin which forms a nontacky coating such that the proppant remains free flowing at ambient temperatures. The resin is reactive at higher temperatures, however, to soften and then cure into an infusible cross linked state. During the method of the present invention, the entire mold assembly, including the base pipe, inner and outer molds, and resin coated particles is heated to recommence polymerization of the resin coating. Initially, the resin in the annulus fuses and unites at the contact areas between contiguous particles. As the temperature increases, polymerization proceeds until the resin is cured into an insoluble and infusible cross-linked state. The contact regions between the adjacent particles bond the packed particles into a permeable network having considerable strength.

The assembly is allowed to cool whereupon the inner and outer molds are removed from the base pipe and pre-bonded particles, to provide a prepacked resin bonded well liner having improved porosity and reduced manufacturing costs.

The method of present invention overcomes the impediments of prior prepacked well liners by partially polymerizing the thermosetting resin prior to the mold process. Prior to filling the mold assembly, the resin is partially polymerized to the particles to create a nontacky surface that is hard to the touch at ambient temperatures. This enables the particles to remain free flowing and inconglomerate while being positioned in the mold assembly. Further, the nontacky properties of the thermosetting resin inhibits the flow of the resin into the particle interstices during the heating procedure. However, because the resin is only partially polymerized, the resin fuses and unites at contact areas of contiguous particles. The partial polymerization thus alleviates the problems associated with resin flowing into the interstitial areas between contiguous particles which plug the liner during the molding process. In this manner, the present invention is a high strength prepacked well liner with improved porosity and improved well pumping capabilities.

The present invention also overcomes the handicaps of gravel packing which usually comprises a perforated metal pipe concentrically mounted inside a steel wire wrap screen. The present invention does not require the complex procedure of packing a granular slurry of water and proppant into the annular space around the perforated mandrel at the well site to introduce the filter. Further, steel wire wrapping is not needed to position the proppant in place around the perforated mandrel. This eliminates the difficulties associated with a steel wire wrapping which is costly and susceptible to tearing. The method of the present invention produces a resin bonded well liner that is less susceptible to damage than a liner employing a steel wire wrapping because there is no wire which can entangle or break. Accordingly, there is no concern that the broken or entangled screen will release the proppant down the well. Further, the present invention is economically superior to conventional liners because the prebonded proppant eliminates the need for an expensive wire wrapping.

The present invention also ensures a completely uniform liner in high angle wells. Presently, when employing current packing techniques, high angle and horizontal wells present difficulty in the proper placement of the proppant, often leaving voids. Because the method of the present invention manufactures the liner and proppant assembly prior to introduction into the well, uniform proppant bonding can be effected.

It is an object of the present invention to provide a method of manufacturing a prepacked bonded well liner that has increased porosity with respect to previously manufactured prepacked well liners.

It is an additional object of the present invention to provide a method of manufacturing a prepacked bonded well liner that does not include a wire wrap. The present method of manufacturing being both simplistic and inexpensive.

Further, is an object of the present invention to produce a prepacked bonded well liner that has high strength and is suitable for the pressures and temperatures of a downhole well.

Other features and advantages of the present invention will be appreciated by those skilled in the art upon reading the detailed description which follows with reference to the attached drawings.

BRIEF DESCRIPTION OF THE DRAWINGS

These and other features, aspects, and advantages of the present invention will become better understood with regard to the following description, appended claims, and accompanying drawings where:

FIG. 11 is a side view of the mold assembly and base pipe illustrating a preferred embodiment of the heating operation of the present invention in which the mold assembly, resin coated particles and base pipe are heated in an oven;

FIG. 12 is an expanded view of the mold assembly and prepacked well liner illustrating the removal of the mold assembly;

DETAILED DESCRIPTION OF THE INVENTION

Figure 1:
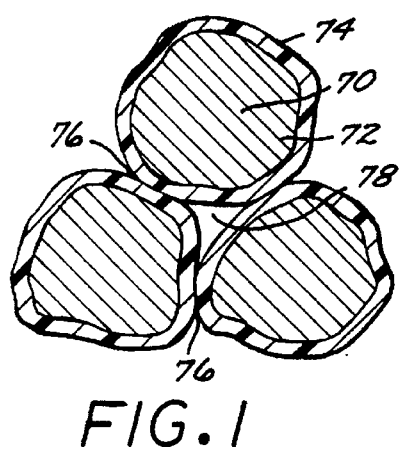
FIG. 1 is a cross-sectional view of the free flowing resin coated particles of the present invention.

While the present invention is susceptible of embodiment in various forms, there is shown in the drawings and will hereinafter be described a presently preferred embodiment of the invention, with the understanding that the present disclosure is to be considered as an exemplification of the invention, and is not intended to limit the invention to the specific embodiment illustrated.

Figure 4:
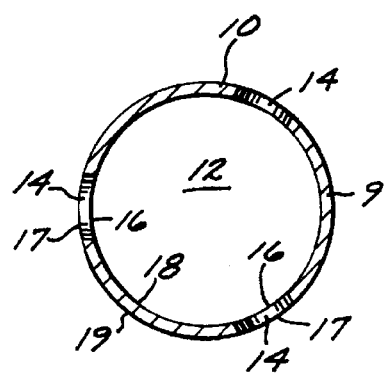
FIG. 4 is a cross-sectional view of the base pipe of FIG. 3.
Figure 3:
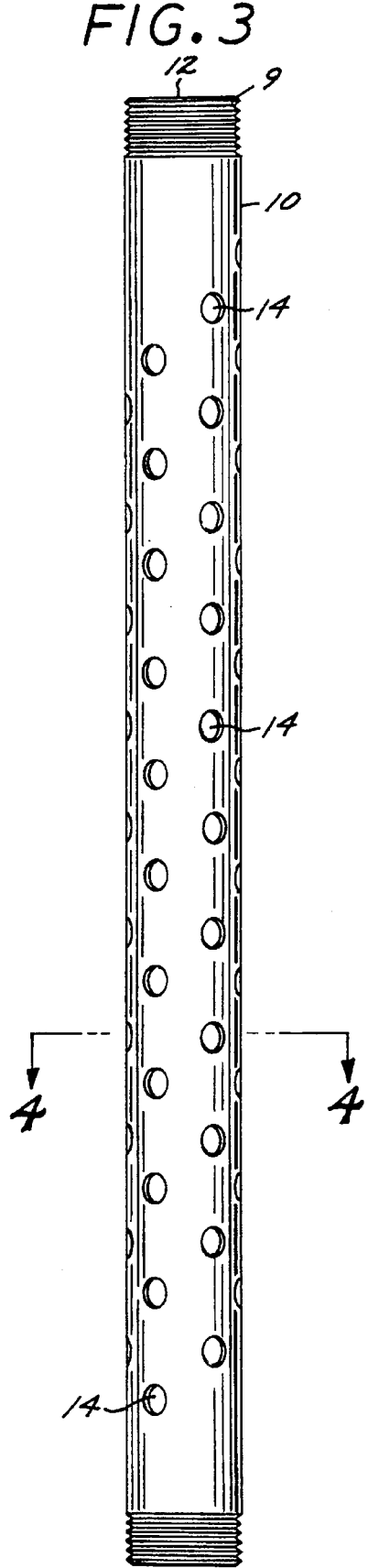
FIG. 3 is a side view of the base pipe of the present invention.
Figure 15:
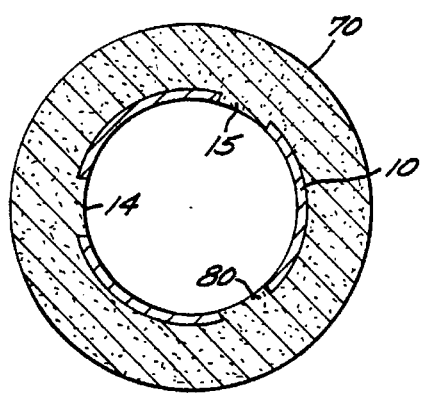
FIG. 15 is a cross-sectional view of the prepacked well liner of the present invention.
Figure 14:
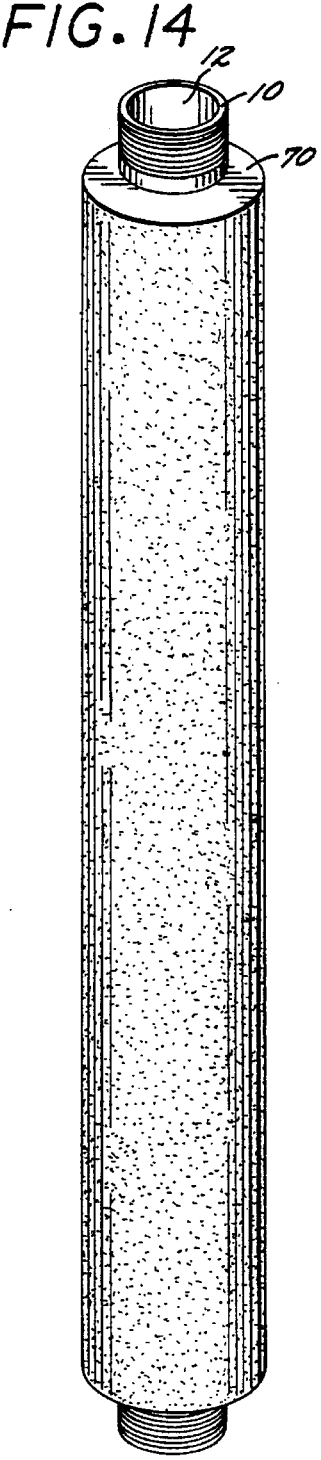
FIG. 14 is a longitudinal view of the prepacked well liner of the present invention.

The present invention provides for an apparatus and an improved method for manufacturing a prepacked well liner, as shown generally in FIGS. 14 and 15. Referring to FIGS. 3 and 4, a base pipe 10 comprising a robe 9 having a concentric bore 12 is machined to include a plurality of apertures 14 thereby defining inner portals 16 and outer portals 17 in the base pipe inner and outer sidewall 18 and 19, respectively. The base pipe may be of any length, with maximum lengths of 40 feet generally accepted in the art. Machining may be effected by boring, drilling, cutting, or any other machining process to create apertures such as holes or slots which are longitudinally and radially spaced along the length of the base pipe. As is standard in the art, each extremity of the base pipe is threaded to allow the base pipe to be coupled to like base pipes to provide an extensible well liner.

Figure 5:
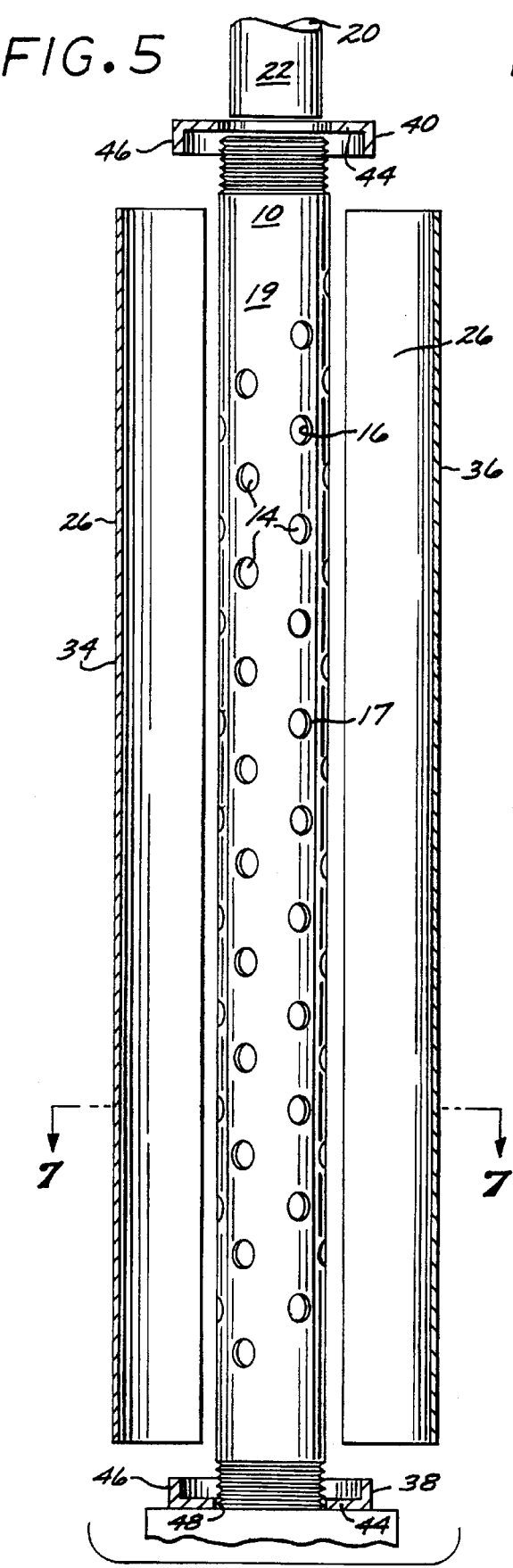
FIG. 5 is an expanded view of the mold assembly and base pipe illustrating the preferred embodiment of the present invention.
Figure 8:
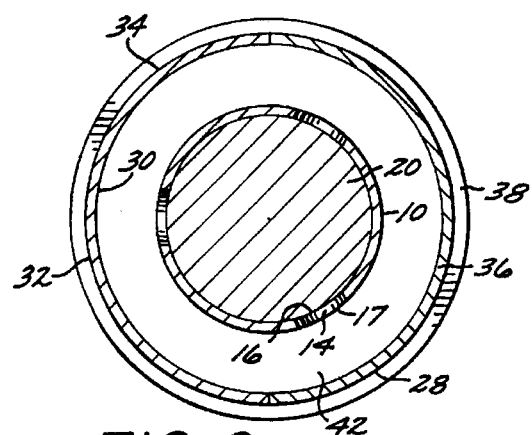
FIG. 8 is a cross-sectional view of the mold assembly and base pipe of FIG. 6.
Figure 10:
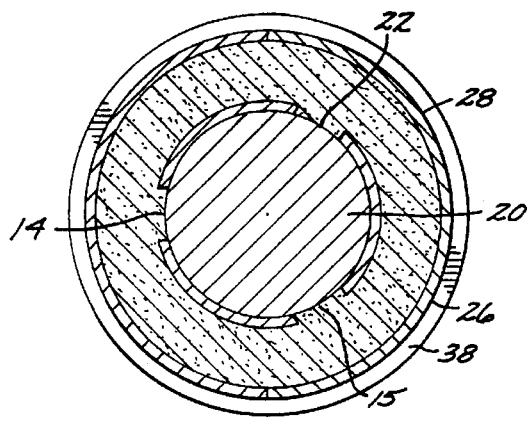
FIG. 10 is a cross-sectional view of the resin coated particles being formed around the base pipe of FIG. 9.

Referring to FIGS. 5, 8 and 10, the method of the present invention further employs an inner mold 20 which restricts the flow of particulate matter through the base pipe apertures 14 during the manufacturing process. The inner mold is positioned in the base pipe bore 12 and functions to restrict the flow of proppant through the apertures 14 and into the base pipe bore while forming the proppant 70 into an annular filter to be bonded to the cylindrical surface of the base pipe. In a preferred embodiment, the inner mold is configured as a cylinder having a diameter equal to the inner diameter of the base pipe and a length sufficient to block the base pipe apertures once the inner mold has been inserted into the bore 12 of the base pipe. Once the inner mold is in place, the exterior cylindrical surface 22 of the inner mold engages the inner portals 16 of the apertures 14 thereby obstructing passage therethrough. In this manner, the previously open apertures form cavities 15 in the base pipe originating at the outer portals and terminating at the surface of the inner mold as shown in FIG. 10.

Figure 6:
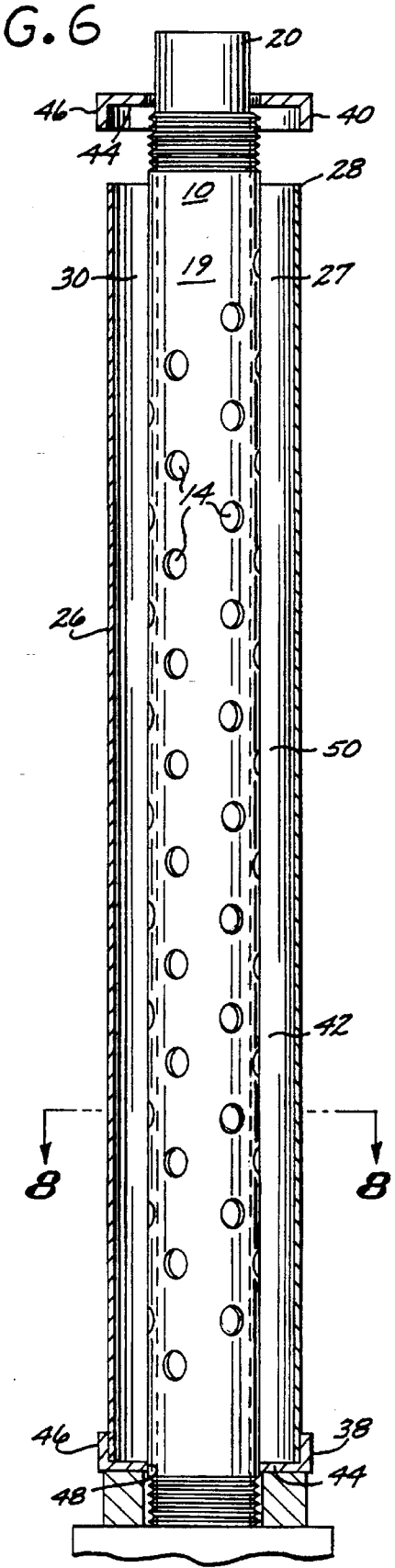
FIG. 6 is a cross-sectional view of the mold assembly and base pipe illustrating the preferred embodiment of the present invention.
Figure 7:
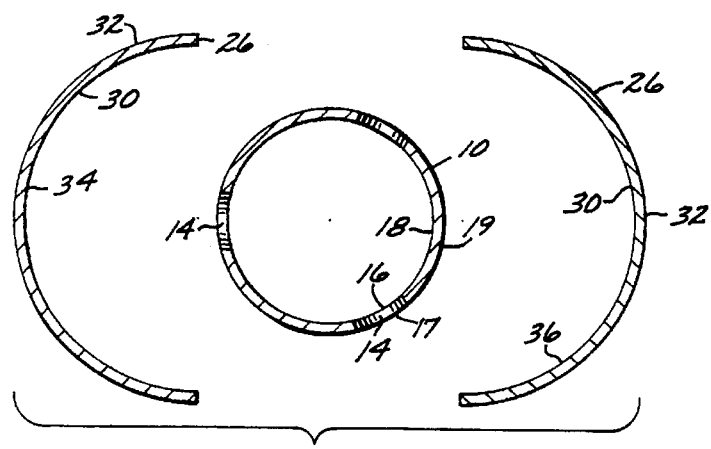
FIG. 7 is a cross-sectional view of the mold assembly and base pipe of FIG. 5.

Similarly, an outer mold 26 is employed to shape the proppant filter by positioning the base pipe 10 and inner mold 20 into the outer mold, as shown in FIGS. 5, 6 and 7. In a preferred embodiment, the outer mold includes a cylindrical inner bore 27 of a diameter greater than the diameter of the base pipe. In a preferred embodiment, a pipe 28, having a diameter larger than the outer diameter of the base pipe and having a length less than the length of the base pipe, functions as the inner and outer sidewalls 30 and 32, respectively, of the outer mold. The outer mold pipe is slit along its length to form two opposing pipe halves, 34 and 36, respectively. The two halves are joined lengthwise in clamshell fashion to allow the simplistic installation and removal of the outer mold from the base pipe. The outer mold further includes endplates 38 and 40, respectively, at the outer mold extremities to form a cylindrical cavity 42 internal to the outer mold. As would be appreciated in the art, the endplates may be integrated or detachable with the outer mold pipe.

In a detachable embodiment, the endplates 38 and 40 are configured as circular plates 44 having an annular ring 46 extending from the circular plate's periphery. The inner diameter of the annular ring corresponds to the outer diameter of the outer mold pipe 28 such that an extremity of the outer mold pipe telescopes into the annular ring to engage the endplate circular plate. In this manner, when the endplates are affixed to the outer mold pipe, the outer mold bore terminates at its extremities at the endplates, thereby forming a cylindrical cavity 42 within the outer mold. The endplates further include a concentric circular orifice 48 of a diameter substantially equal to the diameter of the base pipe 10. As discussed below, during the manufacturing process of the present invention, the base pipe, having the inner mold 20 configured internal to the base pipe bore 12, is positioned into the outer mold cavity 42 with the extremities of the base pipe telescoping through the endplate orifices 48 to form an annulus 50 between the base pipe 10 and inner sidewall 30 of the outer mold pipe 28, as shown in FIG. 8.

Figure 2:
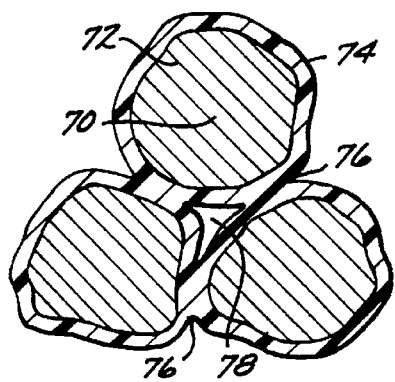
FIG. 2 is a cross-sectional view of the resin coated particles bonded in a cross-linked state.

Referring to FIGS. 1 and 2, the method of the present invention also employs proppant 70 comprising particles 72 coated with resin 74. The proppant is formed into a filter to screen and prevent the entry into the base pipe of sand and other finely divided solids from the producing formation. The proppant may be any particulate of any size suitable for the surrounding formation. Particles from 6 to 200 mesh (U.S. Standard Sieve) are generally used. The choice of the particulate is governed by the properties of the cured mass. For example, in the oil and gas industry extremely high strength proppants are needed to hold open formation fractures. In such an application, the present invention may use glass beads as the particulate substrate. Also used as proppants where stresses are very high, are sintered bauxite, aluminum oxide, ceramics and other mineral particulates may be coated. Also suitable for use as particulates are various organic materials such as walnut and pecan shells, synthetic polymers such as nylon, polyethylene and other resin particles. Metallic particles such as steel and aluminum pellets or shavings can also be coated.

The resin coating the proppant is generally any resin capable of being coated on the particle and then being cured to a higher degree of polymerization. Examples of such resins include phenol-aldehyde resins of both the resole and novolac type, urea-aldehyde resins, melamine aldehyde resins, epoxy resins and furfuryl alcohol resins. The resins must form a solid nontacky coating at ambient temperatures. This is required so that the proppant remains free flowing under normal storage conditions prior to heating. With reference to FIGS. 1 and 2, upon the introduction of heat, the resin 74 fuses and unites at the contact surfaces of contiguous particles 72. Because the resin has been partially polymerized, the resin does not free flow into the interstitial areas 78 between contiguous particles during the heating process. The interstitial areas remain open, thereby maintaining the porosity of the proppant filter and providing for a filter with increased interstitial regions and having the capacity for improved fluid flow. The interstitial regions are small enough, however, to filter and screen sand and finely divided solids disposed in the fluid, from flowing through the proppant filter.

A preferred embodiment of the resin coated proppant is produced by Santrol Products, Inc. under the tradename Super HS, and Super Sand. The resin coated proppant is manufactured to the methods disclosed in issued U.S. Pat. Nos. 4,518,039, 4,585,064, 4,597,991, 4,732,920, and 4,888,240 which are hereby incorporated by reference.

Referring to FIG. 5, in a preferred embodiment of the present invention, the cylindrical inner mold 20 is positioned in the inner bore 12 of the base pipe 10 to block the base pipe apertures 14 and particulate communication therethrough. A first endplate 38 is then press fit to a first extremity of the outer mold pipe 28, as shown in FIG. 6. Once the first endplate has been affixed, the base pipe and integrated inner mold are concentrically inserted into the outer mold bore 27 with a first extremity of the base pipe telescoping through the orifice 48 of the first endplate. Thereafter, the assembly is positioned vertically with annular space 50 between the base pipe and outer mold positioned longitudinally.

Figure 9:
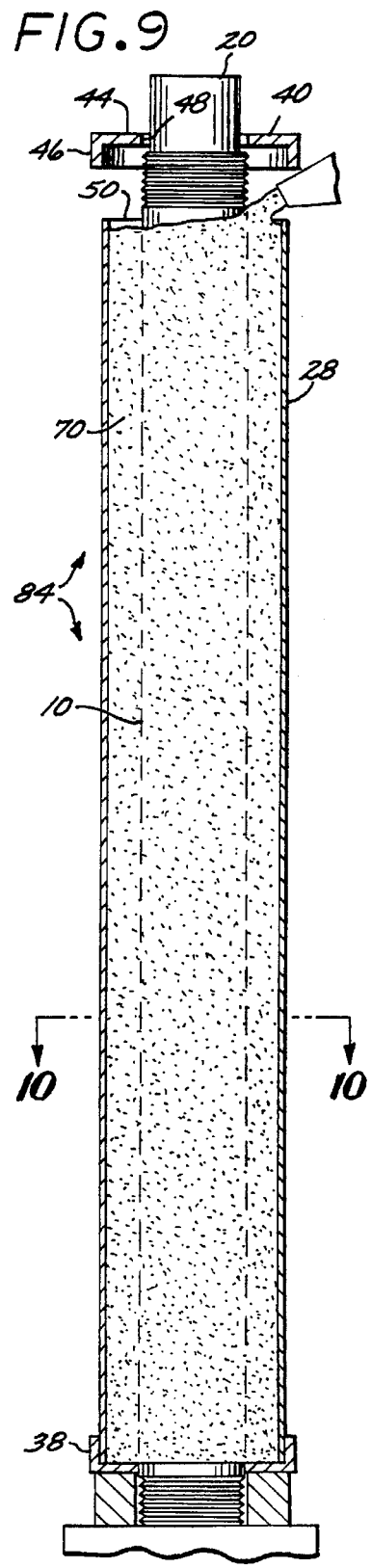
FIG. 9 is a cross-sectional view of the resin coated particle being formed around the base pipe illustrating a preferred embodiment of the present invention.

Referring to FIG. 9, once positioned, the annulus 50 between the base pipe and outer mold sidewall is filled with resin coated proppant 70. Filling may be controlled by simply pouring or pumping the resin coated proppant into the annulus. Thereafter, the second endplate 40 is affixed to the second extremity of the outer mold pipe 28 with the second extremity of the base pipe 10 telescoping through the concentric orifice 48 of the second endplate. The entire mold assembly 84 is then heated in an oven 82, as illustrated in FIG. 11. Referring also to FIGS. 1 and 2, upon the introduction of heat, the resin coating the proppant softens and unites at the contact areas 76 between contiguous particles 72 while maintaining the interstitial areas 80 between particles. As the polymerization proceeds, the resin cures into an insoluble and infusible cross-linked state. The contact regions between the adjacent particles bond the packed particles into a highly permeable network of considerable strength.

Figure 13:
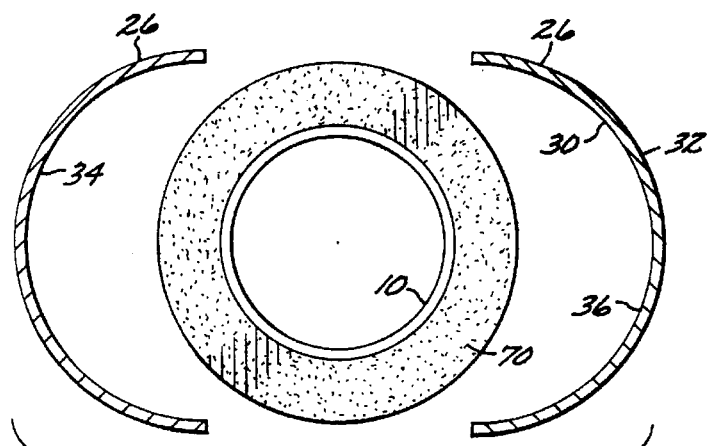
FIG. 13 is an expanded end view of the mold assembly and prepacked well liner illustrating the removal of the mold assembly of FIG. 12.

In a preferred embodiment of the heating operation of the present invention, the mold assembly is heated to 300° F. for six hours. The assembly is then allowed to cool, and the inner and outer molds are removed, as illustrated in FIGS. 12 and 13. As one in the art would appreciate, the inner mold 20 may be removed by simply sliding the inner mold from the base pipe bore 12. Further, once the endplates 38 and 40, respectively, have been removed from the outer mold pipe 28, the two pan configuration of the outer mold allows the well liner to be easily removed. Though the inner and outer molds may be easily removed from the resin bonded proppant, the resin bonded proppant remains securely affixed to base pipe. The resin between the base pipe and contiguous particles bonds the cross-linked resin coated proppant to the base pipe. Further, referring to FIGS. 14 and 15, when the free flowing resin coated particles are poured into the annular space 50 between the outer mold and the base pipe, the resin coated proppant forms projections 80 into the cavities 15 of the base pipe 10. Therefore, once cured, any attempt at removing the resin bonded proppant from the base pipe is restricted by the proppant projection's resistance to shearing. As shown in FIGS. 14 and 15, a high strength prepacked well liner with improved porosity and improved well pumping capabilities is thereby provided. The resin coated proppant has enlarged interstitial regions while, still restricting the flow of solids into the base pipe bore 12. The prepacked well liner may then be introduced into a well bore to effect the filtering and production of subterranean fluid.

Although the method of the present invention has been described with reference to preferred embodiments, workers skilled in the art will recognize that changes may be made in form and detail without departing from the spirit and scope of the invention.

What is claimed is:

1. A method of filtering subterranean fluid from a well bore, comprising:

forming a plurality of apertures into a base pipe to form a perforated pipe, said base pipe being substantially cylindrical in configuration with a concentric first bore disposed along the axis thereof to define a tubular sidewall, said apertures longitudinally spaced and formed radially therethrough;

positioning said perforated pipe in an outer mold, said outer mold having a second bore of a diameter larger than the outer diameter of said perforated pipe, said perforated pipe positioned to form a space between said outer mold and said perforated pipe;

filling said space with particles, said particles being coated with resin which is partially polymerized to form a nontacky coating upon said particles such that said particles remain free flowing at ambient temperatures, said resin being reactive to soften or melt when heated to temperatures above ambient and then cure into an infusible cross-linked state;

heating said resin coated particles such that said resin fuses and unites at contact areas between contiguous particles to form a porous matrix having interstices of a predetermined size when said resin has cured, with said porous matrix affixing to said perforated pipe to define a prepacked resin bonded well liner;

extracting said outer mold from said prepacked resin bonded well liner;

introducing into a well bore said prepacked resin bonded well liner; and allowing the subterranean fluid to flow through said interstices of said porous matrix and into said first bore of said base pipe while restricting therethrough the passage of solid particulates of a size greater than said interstices.

* * * * *